Sept. 6, 1932.    L. IVERSEN ET AL    1,876,456
SHEARS
Filed Jan. 10, 1928    6 Sheets-Sheet 4

INVENTOR

Patented Sept. 6, 1932

1,876,456

UNITED STATES PATENT OFFICE

LORENZ IVERSEN, OF PITTSBURGH, AND ROBERT E. NOBLE, OF CRAFTON, PENNSYLVANIA, ASSIGNORS TO MESTA MACHINE COMPANY, OF PITTSBURGH, PENNSYLVANIA, A CORPORATION OF PENNSYLVANIA

SHEARS

Application filed January 10, 1928. Serial No. 245,704.

The present invention relates broadly to the art of metal working, and more particularly to metal cutting and punching. It is customary in the art to which the present invention relates to effect the cutting of moving material by apparatus usually referred to as flying shears. In order to effect the desired cutting operations without buckling or tearing of the material being operated upon, it is necessary that the cutting equipment shall be capable at the time of cutting of assuming a speed substantially equal to the speed of travel of the material. In other words, the shear blades should have an instantaneous cutting speed substantially equal to the speed of movement of the traveling material.

And not only is it desirable to provide mechanism for giving an instantaneous cutting speed of the order desired, but it is also desirable to provide means for controlling the length of the cut so that successive cuts of the same length may be made with accuracy and precision, or so that the lengths of the sheared pieces may be changed at the will of the operator without changing the relation at the time of cutting between the speed of the shear blades and the speed of travel of the material.

It will be apparent to those skilled in the art that with ordinary shearing mechanism or cutting mechanism driven at a constant speed, successive cuts will recur at equal time intervals in such manner that the lengths of successive pieces will be equal if the speed of travel of the material is maintained constantly. If the speed of the cutting mechanism is increased or decreased while maintaining a constant speed of travel of the material, successive cuts will be respectively shorter or longer, but the instantaneous cutting speed of the mechanism will not be in synchronism with the delivery speed of the material. This will create a tendency to either tear or buckle the material with resultant danger of injury to the material, or the shear mechanism, or both.

With any mechanism of the character herein contemplated a complete cutting cycle may be divided into two parts. The first of these represents the period of time during which the knives are in actual engagement with the material being cut, and the second is the period of time during which such engagement does not exist. The major portion of this second interval is represented by the return movement of the blades from a cutting position into a position for the commencement of a succeeding shearing operation.

Since a disturbance of the first period will throw the mechanism out of synchronism with the material, the present invention preferably contemplates the maintenance of substantially constant conditions during this first period with variable conditions during the second period. By increasing the duration of the second period, the duration of the complete cycle may be increased and thereby result in the cutting of longer pieces without interrupting the actual cutting speed, while by decreasing the duration of the second period, the complete cycle is shortened and the material is cut into shorter lengths without changing the instantaneous cutting speed. The present invention may therefore be considered as relating partly to means for changing the length of the second period in a convenient and expeditious manner.

The invention further relates to improved driving mechanism for a shear whereby the main driving motor may be run at a constant speed for any given delivery speed of the material even though the length of a cycle, and consequently the length of a cut, is varied. Such a constant speed of the driving motor makes it possible to so govern the speed thereof that the speed of the shear knives during the first period is held in synchronism, or substantial synchronism, with the delivery speed of the material and automatically follows variations in that speed to maintain the accuracy of the length cut. Such results would be obtained, for example, by the use of synchronous motors for the shear and for the material respectively.

The invention further contemplates means for varying the time of a complete cutting cycle and the length of cut of successive pieces of material easily and conveniently while the shear is in motion and without stopping or altering the desired speed of operation of the main driving motor.

Still other objects and advantages of the present invention will be apparent from the following specification and drawings constituting a part thereof and in which there are shown, for purposes of illustration only, certain preferred embodiments of our invention.

While the present invention is herein illustrated in connection with shears of different types, it will be apparent to those skilled in the art that it is equally adaptable to the driving of other mechanisms in which a variable time period is desirable in a given cycle of operations while maintaining another period substantially constant.

Figures 1, 2:
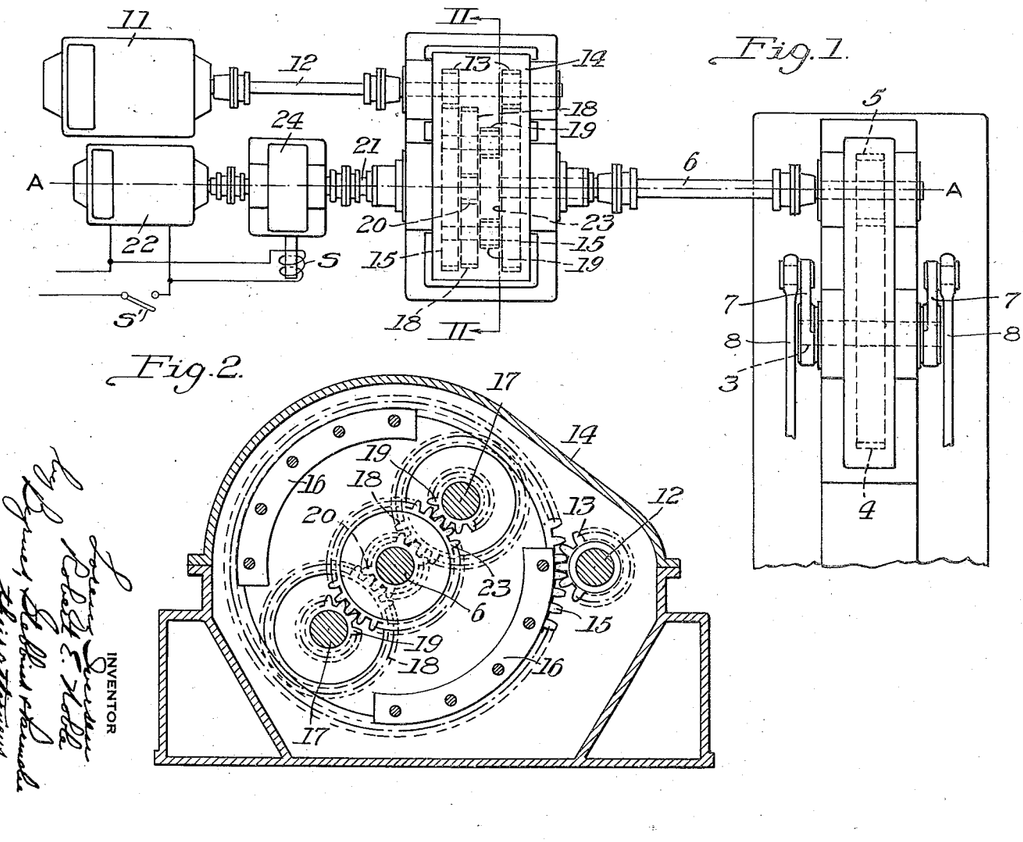
Figure 1 is a diagrammatic top plan view of one form of driving mechanism in accordance with the present invention.
Figure 2 is a detail sectional view, on an enlarged scale, on the line II—II of Figure 1.
Figure 3:
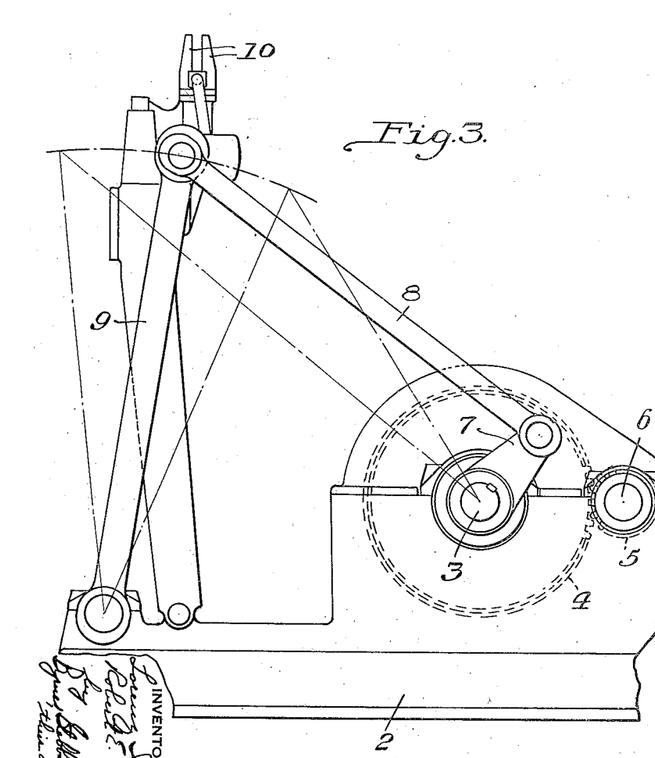
Figure 3 is an end elevation of a portion of the mechanism illustrated in Figure 1, showing the same in driving relationship to a flying shear.

In accordance with the present invention, as illustrated, for example, in Figures 1, 2 and 3 of the drawings, there may be provided a suitable base 2, having bearings therein for a shaft 3, carrying a gear 4, driven by a gear 5, on a shaft 6. The shaft 3 may be provided with one or more cranks or eccentrics 7, operatively connected by links 8 to the frame 9 of a flying shear of any desired construction. It will be apparent upon movement of the links 8 in one direction the blades 10 will be brought into shearing relationship with the material passing therebetween, while upon movement in the opposite direction, the shears will return to their original position.

For driving the shears to produce the desired operation thereof, there may be provided a main driving motor 11, having its armature-shaft operatively connected to driving shaft 12, carrying driving pinions 13 within a housing 14 in which the driving shaft is journalled. The driving pinions 13 mesh with comparatively large gears 15 suitably mounted in the housing 14 and supported for free rotation about the axis A—A. These large gears are preferably tied together in any desired manner as, for example, by braces 16 extending therebetween and suitably secured thereto and constituting part of a planetary system. This system further includes shafts 17 equally spaced on opposite sides of the axis A—A and each carrying a planet gear 18 and a second planet gear 19. The pairs of planet gears 18 and 19 may be secured together, or formed integral; or the necessary simultaneous rotation may be effected by keying both a gear 18 and a gear 19 to each shaft 17. The planet gears 18 are provided for cooperation with a sun gear 20 secured in any desired manner to a control shaft 21 connected to the armature shaft of an electric control motor 22.

The planet gears 19 are provided for cooperation with a sun gear 23, secured to the shaft 6 adjacent the end opposite that which carries the pinion 5. The shafts 6 and 21 are in axial alignment and are both rotatable about axes coincident with the axis A—A.

The operation of a mechanism of this character is substantially as follows:

The run out or delivery speed of the material to be cut having been determined, the motor 11 is operated at a speed bearing a direct relation thereto. This is true likewise of the planetary system driven by the main driving motor. During the first period of a cycle, which period for sake of convenience will hereinafter be referred to as the cutting period, the control shaft 21 is automatically held stationary by a brake or stop 24; and the shear is driven from the drive shaft 12 through the driving pinions 13 and the large gears 15, constituting part of the planetary system. The brake or stop 24 may be of the type having a solenoid S to which current flows whenever the motor is supplied with current for driving the latter. In other words, in such a type of brake or stop, the solenoid S will release the brake whenever current flows to the motor to drive the same. A switch S′ is arranged to be manually operated to control the motor 22. A brake or stop 24 may be employed which is of the type disclosed in the patent to H. W. Clark, 1,471,997, dated October 23, 1923. Rotation of the gears 15 produces a planetary movement of the planet gears 18 about the sun gear 20 and causes rotation of the planet gears 18 about their own axes. This rotational movement about their own axes is transmitted through the shafts 17 to the planetary gears 19 and thus to the sun gear 23 for rotating the shears. If the length of cut desired is such that the cutting period could be equal to the second period, which will hereinafter be referred to as the idle period, the brake 24 may be maintained in operative engagement with the shaft 21 and the parts permitted to operate continuously at the determined speed. To obtain a variation in the duration of the idle period, however, the brake or stop 24 is automatically released as the control shaft 21, under the influence of the control motor 22, is permitted to make a desired number of revolutions. This number of revolutions, while it will not interfere with the planetary motion of the planetary system, will influence the speed of rotation of the planet gears about their own axes and will produce an increase or decrease in the speed of rotation of the shaft 6 with a consequent resulting decrease or increase in the duration of the idling period. The idling period is thus seen to be controlled by the direction of rotation of the control shaft and also by the speed of rotation or, in other words, by the number of rotations thereof, it being possible by proper manipulation of the control shaft to obtain any desired speed, within predetermined limits, of the rotary motion, about their own axes, of the planetary gears. The control motor thus impresses or superposes upon an otherwise uniform rotation of the shear mechanism an additional motion preferably only during the idle period, to obtain any desired speed of the shear shaft during this idle period. By proper manipulation of the control shaft during the idle period, the length of cut may thus be easily and conveniently carried at the will of the operator while the shear is in operation without altering or disturbing the uniform rotative speed of the main driving motor.

The mass of the parts driven by the control motor may be comparatively small as compared to the mass of the parts driven by the main drive motor, so that the inertia of the control mechanism is relatively small, permitting it to be quickly brought into play for effecting the desired operation without necessitating any variation in the speed of rotation of the relatively heavy planetary system itself.

Figure 4:
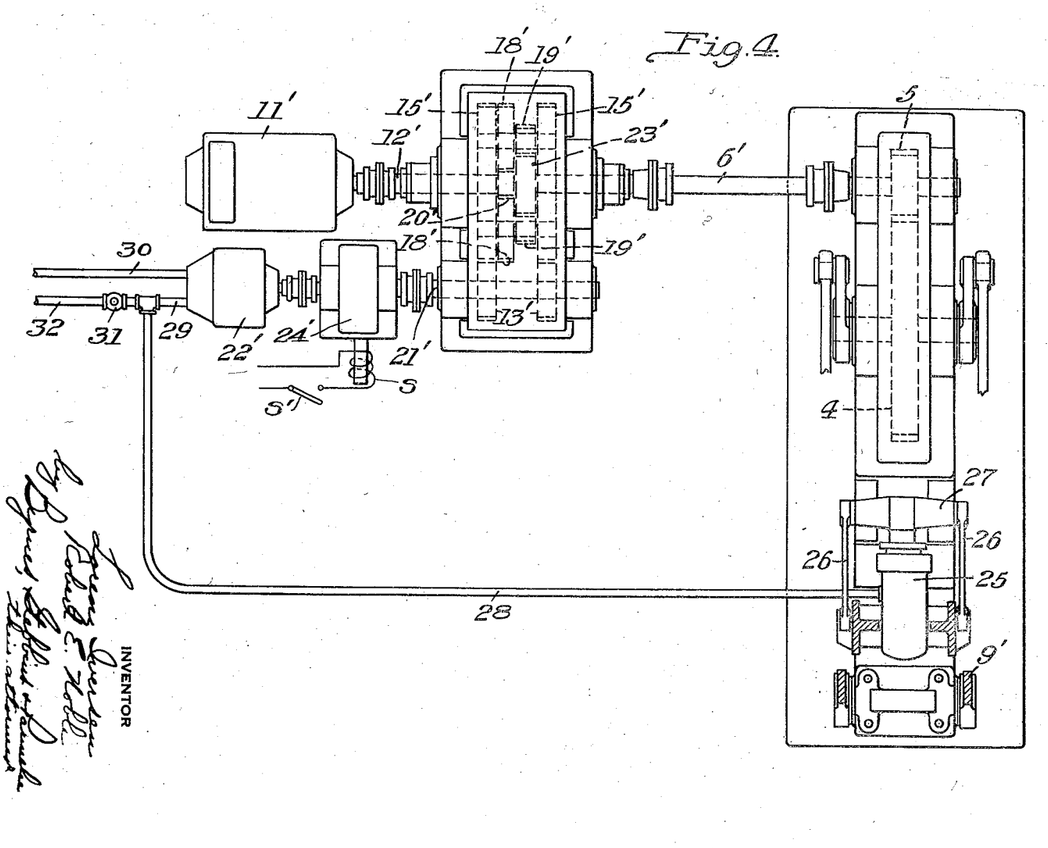
Figure 4 is a view similar to Figure 1, but partly in section and partly broken away, and illustrating a modified embodiment of the invention.
Figure 5:
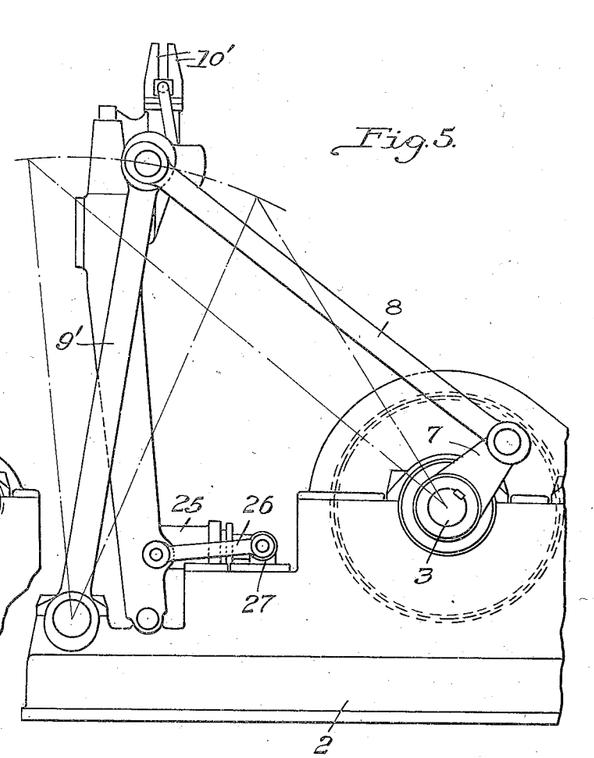
Figure 5 is a side elevational view of the mechanism illustrated in Figure 4.

In certain installations it may be desirable by reason of operating conditions to provide a main drive motor connected to a sun gear and a control motor connected to the planetary system. In Figures 4 and 5 there is illustrated a slightly modified embodiment of our invention in which such an arrangement is provided. In this embodiment of the invention parts corresponding to parts already described are designated by the same reference characters having a prime affixed thereto. In this construction the main driving motor 11' has its shaft 12' arranged to carry the sun gear 20', while the sun gear 23' is secured to the shear shaft 6' as before. The control motor 22' drives the pinions 13' which are secured to the control shaft 21'. The brake or stop 24' includes a solenoid S which may be manually controlled by a switch S'. In this construction, with the control motor held against rotation by the brake or stop 24', the main driving motor will rotate the sun gear 20' which in turn will rotate the planet gears 18' on their own axes. This will in turn effect rotation of the planet gears 19' which will be effective on the sun gear 23' for operating the shears. By releasing the control shaft or by rotating it in one direction or the other the effectiveness of the planet gears 18' may be increased or diminished as will be readily apparent.

In this embodiment of the invention we have replaced the electrical control motor of Figure 1 by a hydraulic control motor of the variable displacement type of which there are a number of different kinds available. This motor may be controlled by a hydraulic displacement cylinder and a plunger 25 operated by the flying shear frame 9' through the links 26 and crosshead 27 as clearly shown in the drawings. The fluid displaced by the cylinder and plunger will pass by the connection 28 to the inlet 29 of the variable displacement hydraulic control motor 22'. The outlet 30 from the motor 22' may lead to a reservoir, not shown, and fluid may be fed to the displacement cylinder through the one-way check valve 31 in the connection 32, leading from such reservoir. The characteristics of such a variable displacement hydraulic motor are such that with a given displacement of fluid in the displacement cylinder 25 any desired number of revolutions of the control shaft 21' may be obtained.

Figure 6:
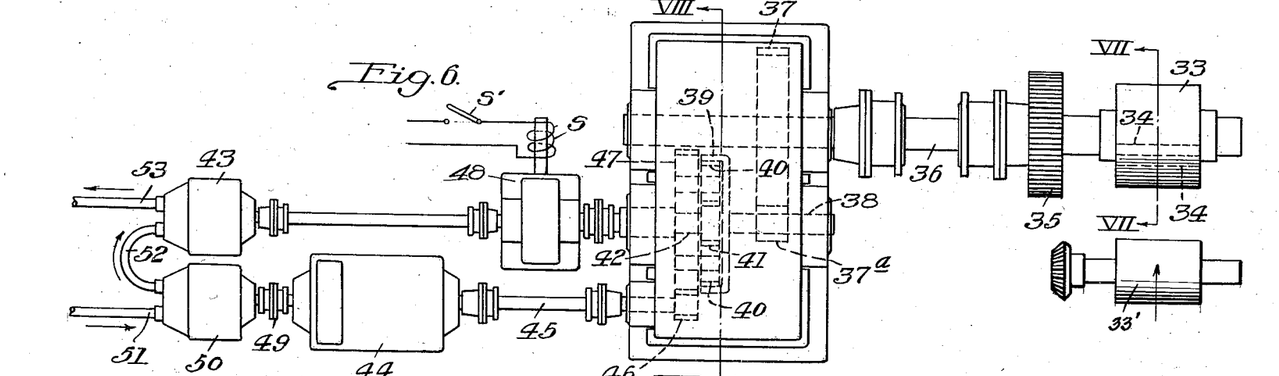
Figure 6 is a view similar to Figures 1 and 4 showing another embodiment of the invention.
Figure 7:
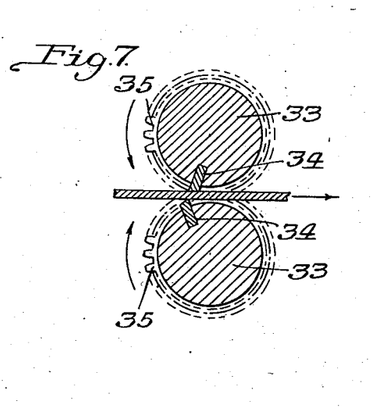
Figure 7 is a transverse sectional view on the line VII—VII of Figure 6.
Figure 8:
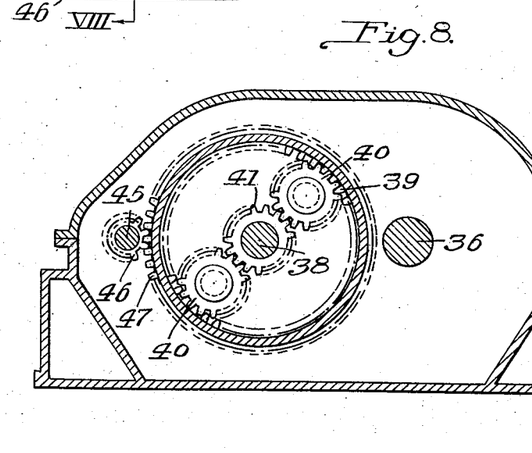
Figure 8 is a transverse sectional view, on an enlarged scale, on the line VIII—VIII of Figure 6.

In Figures 6, 7 and 8 we have illustrated our invention as applied to rotary shears having rotating carriers 33 for the blades 34. The material to be cut may be delivered to the shears by delivering means of conventional type. In Fig. 6 such means are indicated diagrammatically at 33' and may be pinch rolls, or the last stand of rolls of a rolling mill. The carriers may be driven in unison by intergearing the same through gears 35. One of these gears may be driven by a shaft 36 having a gear wheel 37 secured thereto. This gear wheel meshes with a pinion 37ª secured to a shaft 38 on which is mounted an internal sun gear 39. Within the internal sun gear are planetary pinions 40 meshing therewith and meshing with a sun gear 41 on the control shaft 42 of the control motor 43. The main driving motor 44 has its shaft 45 provided with a pinion 46 meshing with a gear 47, the body portion of this gear 47 providing a mounting for the planetary pinions 40. A brake or stop 48 is provided, the same including a solenoid S which may be manually controlled by a switch S'.

With the construction just described, with a brake or stop 48 set, the main driving motor will be effective through the pinion 46 for driving the gear 47 and thus producing a planetary movement of the pinions 40. This planetary movement will be effective on the internal sun gear 39, by reason of the sun gear 41, for rotating the shaft 38 and the shear carriers 33 through the gearing provided. By rotating the control shaft 42 in one direction or the other, the effectiveness of the planetary pinions 40 on the internal sun gear may be varied and the speed of shear operation changed accordingly.

For obtaining a control of the motor 43 we may provide the main driving motor with an extension coupling 49 operatively connected to a variable displacement hydraulic pump 50. This pump has an intake 51 from the reservoir (not shown) and an outlet 52 leading to the intake of the control motor which is of the hydraulic displacement type before described. The outlet 53 of the hydraulic motor may lead to the reservoir before mentioned. With this construction, the motor 44 will be effective through the variable displacement hydraulic pump for producing a predetermined desired operation of the control motor during the idle period of a shearing cycle for obtaining a variation of the character desired.

Figures 9, 10:
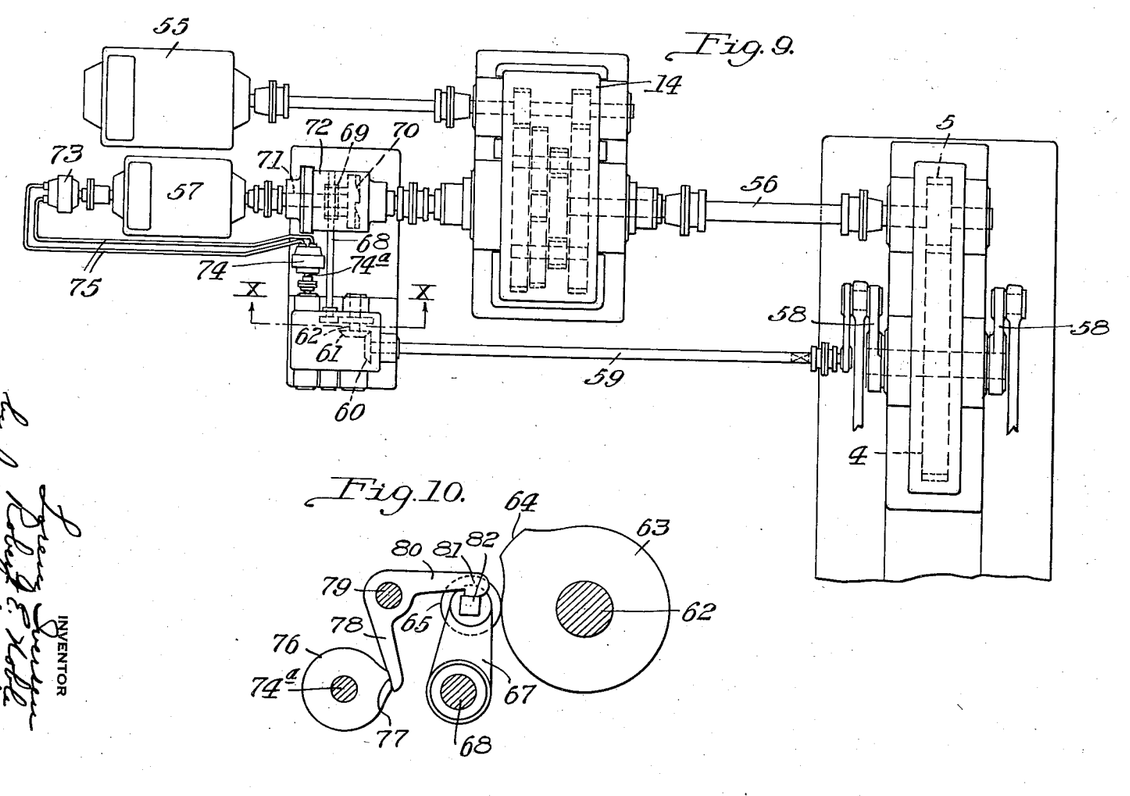
Figure 9 is a view similar to Figures 1, 4 and 6, illustrating still another embodiment of the invention.
Figure 10 is a detail sectional view, on an enlarged scale, on the line X—X of Figure 9.

In Figures 9 and 10 there is illustrated still a further embodiment of the invention utilizing a main driving motor 55 similar to the main driving motor 11 of Figure 1 and operative through a system of gearing of the character therein referred to for rotating the shear shaft 56. The control motor 57 is likewise connected to the planetary gearing system in the manner described in connection with Figure 1. In this embodiment, however, one of the cranks 58 is operatively connected to a shaft 59 effective through a bevel gear 60 for driving a gear 61 on a cam shaft 62. The cam shaft 62 carries a cam 63 provided with a projection 64 adapted to periodically engage a roller 65 on a crank 67 carried by the stop shaft 68. This stop shaft is provided with a yoke 69 effective for moving a stop 70 axially on the control shaft 71 within a fixed casing 72. With the movable stop 70 in such position that it engages the casing 72, the control motor is prevented from rotating. This condition obtains during the cutting period of each cycle. At the conclusion of the cutting period, the stop is released through the cam 63 to permit the control motor to produce a predetermined number of revolutions of the control shaft 71. At the conclusion of this predetermined number of revolutions a variable displacement hydraulic pump 73 is effective through a hydraulic motor 74 of the displacement type for resetting the stop 70. This operation may be effected by providing fluid connections 75 between the variable displacement hydraulic pump and the hydraulic displacement motor, as clearly shown in Figure 9, and by connecting the hydraulic motor 74 to a shaft 74ª provided with a resetting cam 76 having a projection 77 engaging one arm 78 of a trip of bell crank shape having a pivotal mounting 79. The other arm 80 of the trip has a hook shaped portion 81 adapted during the cutting period of each cycle to remain out of engagement with a catch 82 on the crank 67, and adapted during a predetermined portion of the idling period, dependent upon the setting of the variable displacement hydraulic pump, to engage the catch 82 and hold the stop 70 in inoperative position to permit the desired number of revolutions of the control shaft as set forth. After this desired rotation of the control shaft, the variable displacement hydraulic pump will have operated the hydraulic displacement motor to an extent sufficient to bring the projection 77 of the cam 76 into engagement with the trip arm 78 and again release the stop preparatory to a succeeding cutting period.

Figures 11, 12:
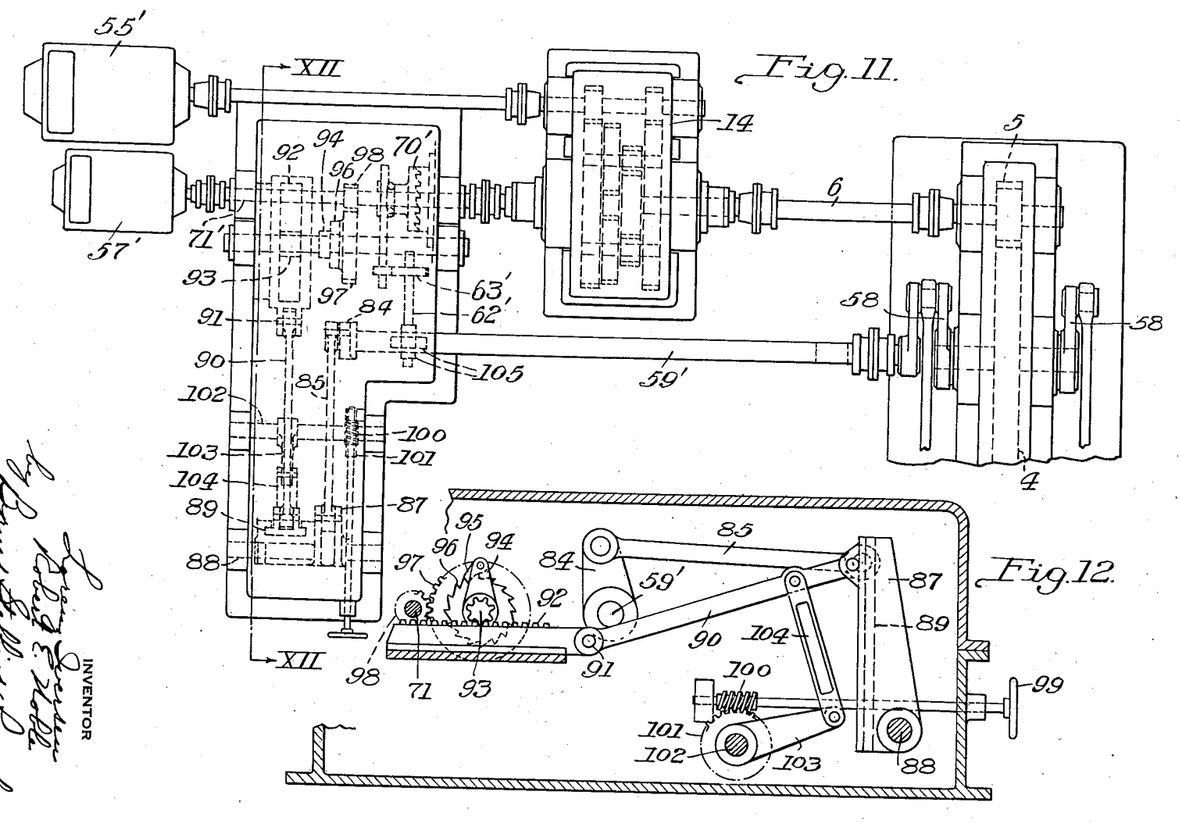
Figure 11 is a view similar to Figures 1, 4, 6 and 9 showing still another embodiment of our invention.
Figure 12 is a detail sectional view, on an enlarged scale, on the line XII—XII of Figure 11.

The construction illustrated in Figures 11 and 12 is similar to that just described with respect to the relationship between the main driving motor 55' and the planetary system, and the relation of the control motor 57' with this system. In place of the hydraulic drive, however, there is substituted a ratchet drive which will now be described in detail. In this embodiment the shear drive shaft 59' is provided with a crank arm 84 pivotally connected to a pitman 85 at one end, the opposite end of which is pivotally connected to the upper end of a lever 87 having a pivotal mounting 88. This lever is provided with a slide 89 to which is pivotally connected at one end a pitman 90, the opposite end of which has a pivotal connection 91 with a rack bar slide 92. This rack bar slide cooperates with a pinion 93 for rotating a ratchet arm 94 carrying a pawl 95 in engagement with ratchet teeth 96 on a gear 97. The gear 97 meshes with a pinion 98 on the control shaft 71' of the control motor.

It will be apparent to those skilled in the art that with a construction of the character just described, the number of rotations imparted to the control shaft 71' will be depending upon the stroke of the sliding rack bar 92. This in turn may be increased or diminished by a hand wheel 99 carrying a worm 100 meshing with a worm wheel 101 on the shaft 102. Secured to this shaft is a crank arm 103 pivotally connected to a link 104, the opposite end of which is pivotally connected to the pitman 90 at a portion intermediate its ends. Upon rotation of the hand wheel 99 in such direction as to rotate the shaft 102 in a clockwise direction as viewed in Figure 12, the slide 89 will be moved downwardly in the lever 87 toward the pivotal mounting 88, and the length of stroke of the slide 92 will be decreased. Upon operation of the parts in the opposite direction the stroke will be increased and the number of revolutions of the control shaft correspondingly varied.

The control shaft 71' may be provided with a normally operative stop mechanism 70' similar to the stop 70 of Figure 9 and intermittently released during the idle period by means of a cam 63' on the cam shaft 62' similar to the corresponding mechanism of Figure 9 and driven through suitable gearing 105 from the shaft 59'.

From the foregoing it will be apparent that the present invention while particularly adapted to shears of a wide variety of different shapes, is equally adapted to any form of driving mechanism wherein different speed conditions of a driven part are desirable during different portions of a cycle. It will also be apparent that the invention is adaptable to various types of planetary, epicyclic, and differential gear mechanisms with stops of a frictional or positive nature.

It will be further apparent that the utility of the invention is not limited to any particular form of driving mechanism for the control shaft, or to any particular type of control for the control shaft, it being only necessary in accordance with the spirit of our invention to cause the control shaft to impress or superimpose upon a normally moving mechanism a controlling influence such that the effectiveness of such mechanism is varied.

The various advantages arising from the use of a driving and control mechanism of the character herein illustrated will readily suggest themselves to those familiar with the art, not only by reason of the fact that a continuously operating main driving motor may be employed, but from the ease of control and variation during a given period of each cycle and from the ability to dispose the moving masses in such manner that inertia plays a relatively small part in obtaining the operation desired.

We claim:—

1. In a shearing mechanism, a main driving member, a shear, means for delivering material to the shear, operative driving connections between said driving member and said shear for normally driving the latter substantially in synchronism with the delivery means, said driving connections including driven control means for changing the speed of the shear in accordance with the speed at which said control means is driven, and means for driving said control means.

2. In a shearing mechanism, a main driving member, a shear, means for delivering material to the shear, operative driving connections between said driving member and said shear, said driving connections including a control element, means for holding the control element stationary for producing driving of the shear in synchronism with the delivery means, and means for driving said control element at any one of a plurality of speeds selectively to control the speed of said shear.

3. In a shearing mechanism, a main driving member, a shear, means for delivering material to the shear, operative driving connections between said driving member and said shear comprising gearing for driving the shear at a plurality of speeds, said driving gearing including a control element stationary during driving of the shear in synchronism with the delivery means and rotating during driving of the shear at a different speed, and means for rotating said control element.

4. In a flying shearing mechanism, a main driving member, a shear, means for delivering material to the shear, operative driving connections between said driving member and said shear comprising a sun gear and planetary gears cooperating with the sun gear, means for maintaining said sun gear stationary to produce driving of the shear in synchronism with the delivery means, and means for rotating said sun gear to produce driving of the shear at a different speed.

5. In a shearing mechanism, a main driving member, a shear, means for delivering material to the shear, operative driving connections between said driving member and said shear for normally driving the latter substantially in synchronism with the delivery means, said driving connections including driven control means for changing the speed of the shear while the speed of the driving member remains substantially constant, a driving motor for the main driving member, and a separate motor for driving said control means.

6. In a shearing mechanism, a main driving member, a shear, means for delivering material to the shear, operative driving connections between said driving member and said shear for normally driving the latter substantially in synchronism with the delivery means, said driving connections including driven control means for changing the speed of the shear while the speed of the driving member remains substantially constant, and means including a variable displacement hydraulic motor for driving said controlling means.

7. In a flying shearing mechanism, a main driving member, a shear, means for delivering material to the shear, operative driving connections between said driving member and said shear comprising planetary gearing, means for maintaining an element of the planetary gearing stationary to produce driving of the shear in synchronism with the delivery means, and means for rotating said element of the planetary gearing to vary the speed of the shear.

8. In a shearing mechanism, a main driving member, a shear, operative driving connections between said driving member and said shear comprising planetary gearing, power driven mechanism for imparting a change in speed to said shear through said planetary gearing, and manually adjustable means for controlling the operation of said power driven mechanism, said manually adjustable control means being adjustable with the shear in operation.

9. In a shearing mechanism, a main driving member, a shear, operative driving connections between said shear and said driving member comprising planetary gearing, and mechanism including a variable displacement hydraulic motor for imparting a change in speed to said shear through said planetary gearing.

In testimony whereof we have hereunto set our hands.

LORENZ IVERSEN.
ROBERT E. NOBLE.